Jan. 22, 1952    J. F. CAMPBELL    2,583,085
FLEXIBLE SLEEVE TYPE VULCANIZING APPARATUS
FOR V BELTS AND THE LIKE

FIG. I

INVENTOR.
BY JOHN F. CAMPBELL
Oldham & Oldham
ATTORNEYS

Jan. 22, 1952　　　　　　J. F. CAMPBELL　　　　　　2,583,085
FLEXIBLE SLEEVE TYPE VULCANIZING APPARATUS
FOR V BELTS AND THE LIKE
Filed Sept. 21, 1949　　　　　　　　　　　　　3 Sheets-Sheet 2

INVENTOR.
JOHN F. CAMPBELL
BY
*Oldham & Oldham*
ATTORNEYS

Jan. 22, 1952    J. F. CAMPBELL    2,583,085
FLEXIBLE SLEEVE TYPE VULCANIZING APPARATUS
FOR V BELTS AND THE LIKE
Filed Sept. 21, 1949    3 Sheets-Sheet 3

INVENTOR.
JOHN F. CAMPBELL
BY
Oldham & Oldham
ATTORNEYS

Patented Jan. 22, 1952

2,583,085

UNITED STATES PATENT OFFICE 2,583,085

FLEXIBLE SLEEVE TYPE VULCANIZING APPARATUS FOR V BELTS AND THE LIKE

John F. Campbell, Cuyahoga Falls, Ohio

Application September 21, 1949, Serial No. 116,873

15 Claims. (Cl. 18—6)

This invention relates to apparatus for vulcanizing V-belts and the like, and, more particularly, is concerned with apparatus of this type including a flexible wrap-around sleeve adapted to surround a substantially cylindrical mold having molding cavities in its outer surface, and with the sleeve being adapted to be held or forced radially inwardly against the mold by vulcanizing fluid under pressure.

It has been proposed heretofore to vulcanize a plurality of V-belts held in stacked molds by a series of steps including positioning the stack of molds inside a cylindrical diaphragm, usually formed of rubber, or rubber and fabric, the diaphragm being held by fluid pressure against the outer periphery of the mold stack, and with vulcanizing heat being applied to the V-belts through the molds, through the rubber diaphragm, or both. Apparatus of the type including a rubber diaphragm has been open to the objection that the diaphragm is subject to repeated vulcanizing temperatures with the result that it has a short and hazardous operating life.

It has likewise been proposed to employ a flexible sheet metal sleeve, but so far as I am aware, these proposals have never met with much success, due primarily, I believe, to the slowness and difficulty of applying and removing the sheet metal sleeve, and due to leakage of the overlapped ends of the sheet metal sleeve if it is of the wrap-around type, with attendant marking and improper vulcanization of the material being vulcanized.

Furthermore, attempts to employ endless flexible metal sleeves or diaphragms in production vulcanizing operations for V-belts and the like have met with little success, and known efforts have resulted in apparatus which is quite expensive to construct, cumbersome to operate, and costly to maintain in operation.

It is the general object of my invention to avoid and overcome the foregoing and other difficulties of and objections to prior art apparatus and methods by the provision of an improved, relatively inexpensive, readily maintained, and easily operated apparatus including a flexible metal sleeve adapted to be pressed under the heat and pressure of the vulcanizing fluid against the outer periphery of a V-belt mold or the like.

Another object of my invention is to provide V-belt vulcanizing apparatus particularly adapted for use in conjunction with the V-belt mold disclosed and claimed in my co-pending application, Serial No. 766,903, filed August 7, 1947, and entitled, "Collapsible V-Belt Mold."

Another object of my invention is the provision of apparatus for vulcanizing V-belts and the like including a pot heater adapted to individually receive a substantially cylindrical V-belt mold assembly, the pot heater containing a flexible metal cylinder formed from a strip of sheet metal with overlapped ends, the metal cylinder being supported in a cage and readily controlled for movement to an expanded position to facilitate receiving or removing the mold assembly, and with the metal cylinder being adapted to be moved to a vulcanizing position in snug relation around the periphery of the mold assembly so that vulcanizing fluid under heat and pressure applied to the outside of the cylinder will hold it with molding pressure against the mold assembly surface.

Another object of my invention is to provide apparatus of the type described in which the entire cage and metal cylinder are readily removed as a unit from the pot heater to allow another cage and cylinder unit to be positioned in the pot heater to thereby provide for the handling of different size or type mold assemblies.

Another object of my invention is the provision of a wrap-around type of flexible metal sleeve or cylinder wherein provision is made for bleeding any vulcanizing fluid to the atmosphere when such fluid tends to seep between the overlapped ends of the wrap-around sleeve.

Another object of my invention is to provide apparatus of the character described wherein the interior of the mold assembly during the vulcanizing operation is connected to substantially atmospheric pressure, and the mold assembly is appropriately vented to prevent the formation of steam or other vulcanizing fluid pockets in the molding cavities, which pockets would distort the formation of perfectly shaped articles during vulcanization.

Another object of my invention is to provide apparatus of the indicated type which is readily adapted to the vulcanization of individually molded standard V-belts, to the vulcanization of individually molded cog-type V-belts, or to the vulcanization of substantially cylindrical sleeves of rubber and fabric, for example of the type adapted to be cut after vulcanization into a plurality of raw-edge V-belts.

The foregoing objects of my invention, and other objects which will become apparent as the description proceeds, are achieved by the provision of vulcanizing apparatus for V-belts and the like comprising a pot heater, a cage in the heater, the cage including a plurality of plates having substantially round central openings therein, one of the plates being positioned at the top and one at the bottom of the cage, a flexible metal cylinder formed from a strip of sheet metal and having overlapped ends carried loosely in the round openings of the cage plates, a ring-shaped gasket secured to the bottom cage plate and having a flexible lip portion engaging with the cylinder, a ring-shaped gasket carried by the top cage plate and having a flexible lip portion engaging with the cylinder, means associated with the overlapped ends of the cylinder and adapted to move the cylinder from a reduced diameter to an expanded position, a mold having molding cavities in its outer surface and adapted to be removably received within the expanded cylinder, a closure for the end of the heater and adapted to seal with the top cage plate, and means for supplying vulcanizing fluid under pressure to the inside of the heater and to the outside of the cylinder. The bottom cage plate normally includes a gasket which rests in sealing relation upon a base provided in the heater, and a conduit extending through the base of the heater is normally provided to connect the interior of the mold with the atmosphere or other reduced pressure area during vulcanization. The means for collapsing and expanding the metal cylinder usually comprise spring and/or pressure cylinder means. Additionally, the overlapped ends of the metal cylinder are formed in a particular manner, and are provided with a venting groove for preventing or reducing the flow of vulcanizing fluid between the overlapped ends into the molding cavities.

For a better understanding of my invention, reference should be had to the accompanying drawings wherein Fig. 1 is a vertical sectional view of one embodiment of vulcanizing apparatus incorporating the principles of my invention;

Figures 4, 5, 7:
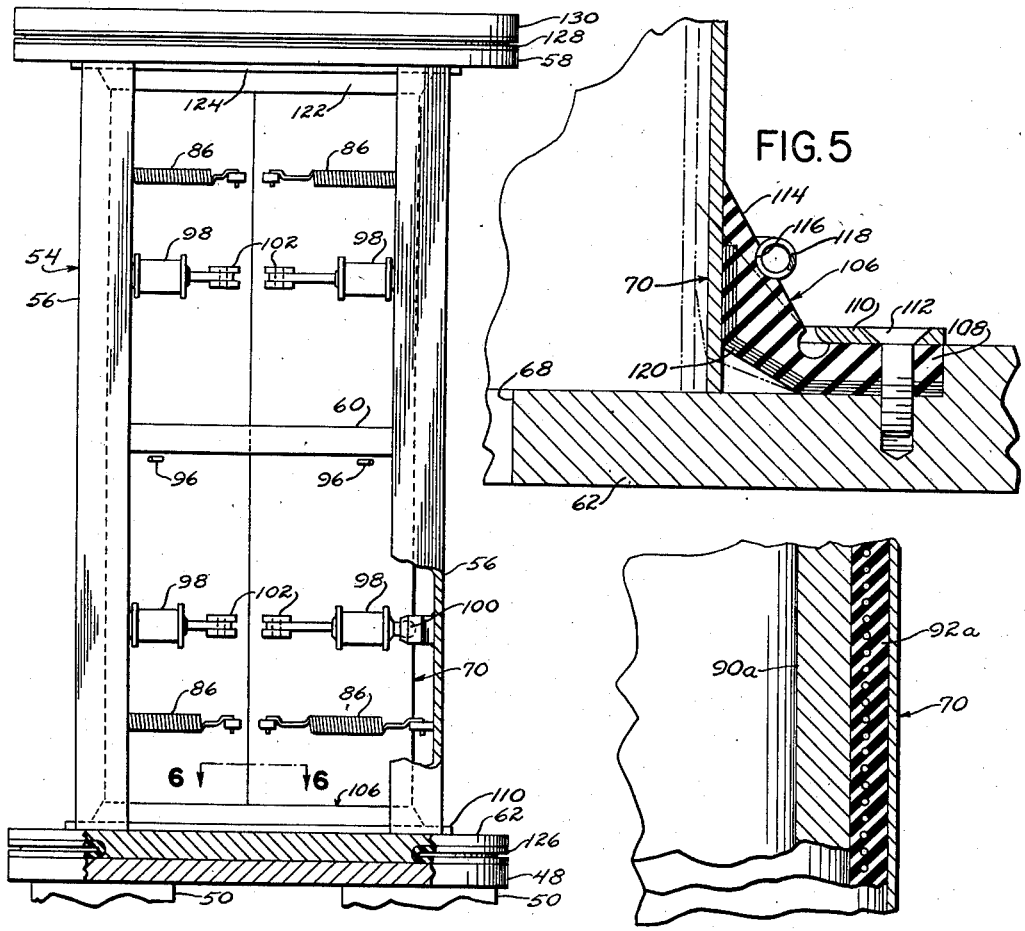
Fig. 4 is a side elevation taken in the direction of line 4—4 of Fig. 2, and partly in section, of the cage assembly and metal cylinder incorporated with the apparatus.
Fig. 5 is an enlarged fragmentary vertical sectional view illustrating the details of one of the sealing gaskets positioned between the metal cylinder and a cage plate.
Figure 6:
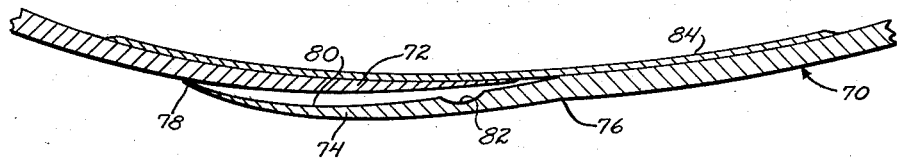

Fig. 6 is an enlarged fragmentary view in horizontal section, and taken substantially on line 6—6 of Fig. 4, of the overlapped ends of the metal cylinder incorporated with the apparatus; and Fig. 7 is an enlarged fragmentary view in vertical section of a portion of the mold, the material to be vulcanized, and the metal cylinder, as employed to vulcanize a substantially cylindrical band of rubber and fabric, as distinct from the vulcanization of individual V-belts.

Referring to the drawings, the numeral 10 indicates generally a pot heater of substantially cylindrical shape having a rounded closed bottom 12 resting upon a cylindrical support 14. For removably closing the upper end of the heater 10, a ring 16 is welded or otherwise secured to the top end of the heater, and the ring 16 makes a bayonet joint connection at 18 with a lid 20. A gasket 22 is usually provided to complete the seal between the ring 16 and the lid 20. The lid 20 is rotatably supported at its center on a pin 24 so that a bar 26 (see Fig. 3) secured to the lid can be manually actuated to move the lid into or out of bayonet joint relation with the ring 16.

The pin 24 is supported by an arm 28 carried at the top end of a shaft 30 journaled for vertical sliding movement, as well as arcuate movement in brackets 32 and 34 formed respectively on the ring 16 and secured to the heater 10. The lower end of the shaft 30 is connected, as at 36, to the piston rod 38 of a fluid pressure cylinder 40 mounted at 42 upon a bracket 44 on the cylindrical support 14.

Figure 3:
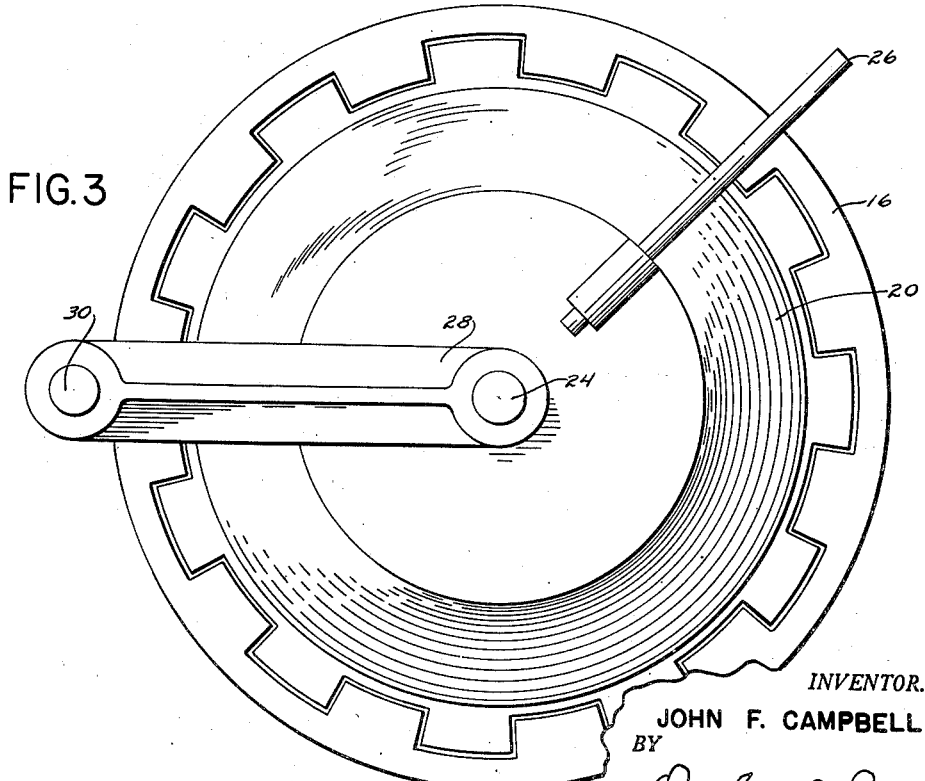
Fig. 3 is a plan view of the apparatus shown in Fig. 1.

In order to open the pot heater 10, the bar 26 is rotated through a small arc to disconnect the bayonet joint 18 between the lid 20 and the ring 16, that is, to the non-engaging position shown in Fig. 3 of the drawings, whereupon the fluid pressure cylinder 40 is actuated to move the shaft 30 upwardly, which causes the lid 20 to move away from the top of the pot heater 10, whereupon the entire lid 20 and supporting arm 28 can be moved laterally with the shaft 30 moving arcuately so that the top of the heater 10 is completely open for the introduction or removal of the material to be vulcanized. Closing the pot heater is a reversal of the operation described.

It will be understood that the pot heater 10 is of a vertical height and of a diameter which will adapt it to individually receive mold assemblies of a reasonable variety of diameters and lengths, but with the heater normally being of comparatively small size so that it attains and retains the advantages of a self-contained unit requiring relatively small floor space and capable of being quickly heated up and repeatedly used. It has been found in the rubber industry that comparatively small self-contained units of this type possess greater efficiencies than large units adapted to vulcanize simultaneously a plurality of mold assemblies. In one typical embodiment, my improved pot heater is some two feet in over-all diameter, and stands some five feet high.

Now again referring to Fig. 1 of the drawings, positioned in the inside of the bottom of the heater 10 is a base 48, usually in the form of a circular plate, the base being carried on spacer brackets 50, and substantially the center of the base 48 is connected by a conduit 52 with the outside of the heater 10, for example, to the atmosphere or to some other source of less pressure than exists inside of the heater during vulcanization.

Figure 1:
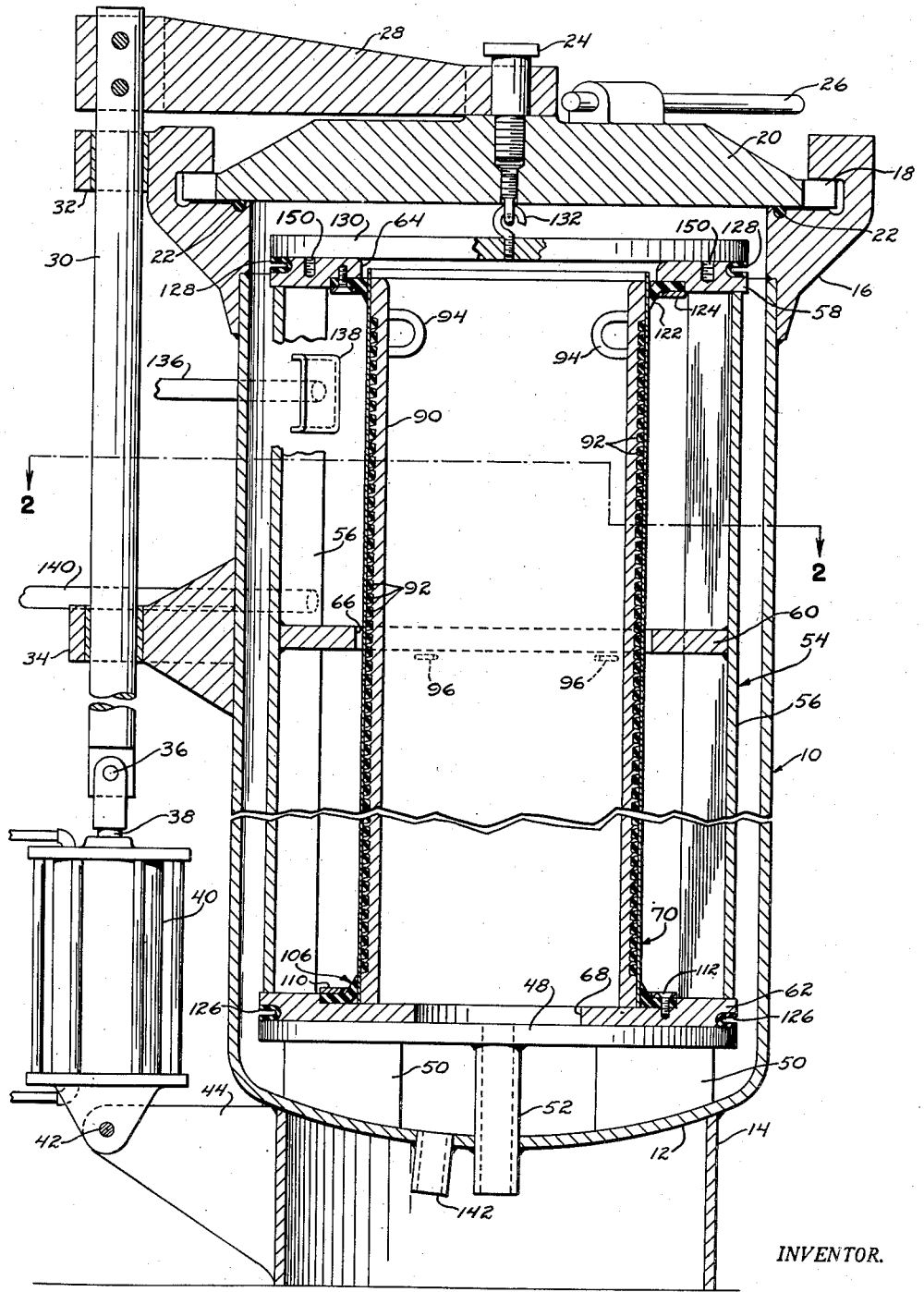
Figure 2:
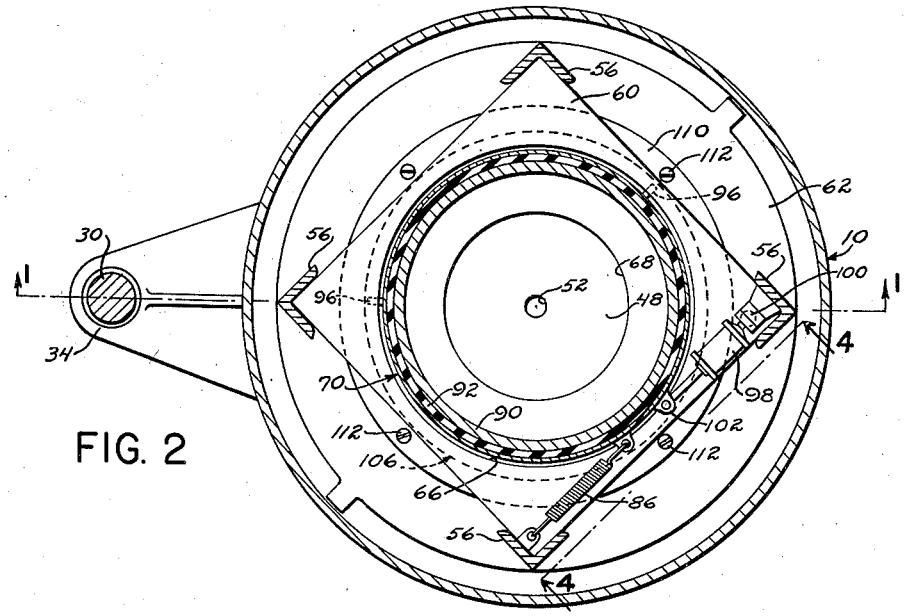
Fig. 2 is a horizontal cross-sectional view taken substantially on lines 2—2 of Fig. 1.

Resting upon the base 48 in the heater 10 is a cage, indicated as a whole by the numeral 54. The cage 54, as best seen in Figures 1, 2, and 4 of the drawings, ordinarily comprises four angle irons 56 positioned at the four corners of the cage, with the angle irons 56 suporting a plurality of plates, for example, the plates 58, 60, and 62, positioned respectively at the top, middle and bottom of the cage. Each of the plates 58, 60, and 62 is formed square as to its periphery, but is provided with a round or substantially round opening at its center, these round openings being indicated respectively by the numerals 64, 66, and 68. It will be noted that the opening 68 in the bottom plate 62 is somewhat smaller than the openings 64 and 66. Received within the openings 64 and 66 is a metal cylinder, indicated as a whole by the numeral 70, and formed from a strip of sheet metal, and having overlapping ends, as best seen in Fig. 6. The lower end of the metal cylinder 70 rests on the top of the bottom plate 62 of the cage.

Referring to Fig. 6, the inside end 72 of the overlapped ends of the metal cylinder 70 is formed with a fine feather, and the outside end 74 is likewise formed with a feathered edge. In addition, the outside end 74 is given a slight bend or offset at the point 76 in an outward direction, and from the point 76 to the edge 78 of the end 74 the strip end is curved inwardly on an arc 80 of somewhat shorter radius than the normal radius of the cylinder whereby the extreme edge 78 of the end 74 is adapted to engage with a light resilient pressure with the end 72 of the metal cylinder 70. Furthermore, a groove 82 is formed in the end 74 of the metal cylinder 70 at a point somewhat nearer to the offset 76 than to the extreme edge 78, this groove extending the full length of the end 74 and serving to allow for the escape of any vulcanizing fluid which should work under the edge 78, all as hereinafter more fully described. A thin metal shim 84 is ordinarily adapted to be associated with the overlapped ends of the metal cylinder 70, the shim 84 being discussed in greater detail at a later point in this description. Preferably the metal cylinder 70 is made from thin stainless steel of high strength and flexibility.

The metal cylinder 70 is adapted to be moved from an expanded position to a reduced diameter position. In the expanded position, the metal cylinder moves out into engagement with the openings 64 and 66 in the cage plates 58 and 60. In fact, I prefer to resiliently hold the metal cylinder in this position, and this can be achieved by the provision of coiled tension springs 86 secured between the cage angles 56 and lugs brazed or otherwise secured to the ends of the metal cylinder 70 near the point of overlap of these ends, as particularly illustrated in Figures 2 and 4.

With the metal cylinders 70 in the expanded position described, it is adapted to receive a mold 90, for example of the type disclosed and claimed in my above-identified co-pending patent application, and including molding cavities in its outer surface adapted to receive a plurality of individually formed V-belts 92, the mold 90 including appropriate vent means. Hooks 94 on the mold provide for the lifting in or out of the mold by means of a conventional chain block or otherwise. Pins 96, positioned in the metal cylinder just below the center plate 60, and located one-eighth inch or so below the plate engage with the plate to prevent the metal cylinder 70 from being lifted out of the cage 54 when the mold 90 is lifted out of the metal cylinder.

In order to move the metal cylinder to a reduced diameter position, that is, to a position snugly around the mold 90 just prior to the vulcanizing operation, I provide fluid pressure cylinders 98 which are secured by ball and socket or other flexible connections 100 to the angles 56 of the cage 54 at one end, and at their other ends are connected to lugs 102 secured to the ends of the metal cylinder 70. The fluid pressure cylinders 98 are actuated by hydraulic conduits (not shown) which extend to the outside of the heater 10. The fluid pressure cylinders 98 not only can be employed to snug the metal cylinder down tightly around the mold 90, but also function to help break the metal cylinder 70 away from the mold 90 after the vulcanizing operation, and this is accomplished by alternately operating the fluid pressure cylinders 98 in opposite directions.

The bottom plate 62 associated with the cage 54 carries a gasket, indicated as a whole by the numeral 106, with this gasket including a flat base portion 108 which is fastened by a clamp ring 110 secured in position by screws 112 to the plate 62, in the manner best seen in Fig. 5. Gasket 106 also includes a flexible lip portion 114 having a recess 116 therein which receives a coiled spring 118, so that the flexible lip portion 114 rests in sealing engagement against the metal cylinder 70 regardless of whether the cylinder is in the expanded full-line position shown in Fig. 5 or in the reduced diameter position shown in chain-dotted lines in Fig. 5. The gasket 106 is made from flexible, high-grade rubber of the quality of air bag stock, which withstands curing temperature and may be reinforced with fabric 120 over the base and up approximately two-thirds of the flexible lip portion 114 of the gasket. A gasket 122, similar to the gasket 106, but positioned inverted, is secured by a clamp ring 124 to the top plate 58 of the cage, and the gasket 122 has a lip portion similar to the gasket 106 and extending into sealing relation with the metal cylinder 70.

The bottom plate 62 of the cage is also provided with a peripheral groove which receives a sealing gasket 126 which effects a seal between the bottom plate 62 of the cage and the base 48 positioned in the bottom of the heater 10. In a like manner, the upper plate 58 of the cage 54 is formed with a peripheral groove which receives a sealing gasket 128 which is adapted to effect a seal with a closure plate 130 having a lost-motion connection 132 with the pin 24. The operation of the closure plate 130 is that this plate is normally carried with the lid 20 so that when the lid 20 is lifted and swung out of position in the manner heretofore described, the closure plate 130 will be simultaneously removed from the top of the cage 54 to provide for the removal of the mold 90. When, on the other hand, the lid 20 is moved back in position, the closure plate 130 comes to rest on the top plate 58 of the cage 54 and the top of the cage is sealed against entry of vulcanizing fluid by means of the gasket 128.

Vulcanizing fluid, for example steam, is adapted to be introduced into the inside of the heater 10 by means of a conduit 136, and a baffle plate 138 is secured to the inside of the heater 10 over the point of entry of the conduit 136 so that the vulcanizing fluid will not strike one point on the metal cylinder 70, but will be directed in both directions around the inside of the heater 10 and in the space outside of the metal cylinder 70. An exhaust conduit 140 may be provided for the removal of the pressure vulcanizing fluid, and a conduit 142 connected through the bottom of the heater 10 may be provided for the periodic removal of condensate.

Briefly describing the vulcanizing operation as performed by my improved apparatus, assuming that a vulcanizing operation has been completed, the interior of the heater 10 is connected to atmospheric pressure, whereupon the bar 26 of the lid 20 is rotated through a small arc to disconnect the bayonet joint 18 between the lid and the ring 16 carried by the heater. Thereupon, the pressure cylinder 40 is energized to raise the lid 20 and the closure plate 130 in a vertical direction to a point of clearance whereupon the lid 20 and associated closure plate 130 are swung laterally out of the way. Then the mold 90 is lifted out from the inside of the metal cylinder 70, the fluid pressure cylinders 98 having been energized back and forth several times to help break the metal cylinder 70 away from the outside of the mold 90. The pins 96, as previously noted, prevent the metal cylinder 70 from being removed with the mold. The springs 86 associated with the cage 54 assist in opening the metal cylinder 70 to its expanded position to facilitate the removal of the mold 90.

Now a second mold 90 having a plurality of belts 92 in the uncured state carried thereby is moved into the metal cylinder 70 through the top of the heater. The shim 84 is laid against the belts and mold as the mold is lowered down into the cylinder 70, the shim being positioned in the region of the overlap of the ends of the cylinder. The shim may bear coding, trade-mark, or other means which will be imprinted on or molded into the belts during cure. Then the fluid pressure cylinders 98 are actuated to snug the metal cylinder 70 down tightly around the mold. The lid 20 and closure plate 130 are swung back into alignment with the heater 10, the pressure cylinder 40 is energized in the opposite direction, the bar 26 is moved through the arc necessary to reestablish the bayonet joint 18, and vulcanizing fluid under pressure is introduced through the conduit 136. The pressure of the vulcanizing fluid is applied directly against the outer surface of the metal cylinder 70, as is the vulcanizing heat, to hold the metal cylinder tightly against the outer periphery of the mold, and to effect the vulcanizing operation.

It will be evident that the vulcanizing fluid cannot get into the inside of the mold 90 because the gaskets 106, 122, 126, and 128 prevent it. Any fluid which may tend to leak between the overlapped ends of the metal cylinder 70 flows down the groove 82 into the inside of the mold which is connected to the atmosphere or other reduced pressure source by the conduit 52. As previously noted, and as described in detail in my co-pending application, the mold 90 may likewise be vented to insure that no vulcanizing fluid is trapped anywhere in the mold during vulcanization. The heat transfer between the relatively thin metal cylinder 70 and the articles to be vulcanized is excellent, and a high-grade, rapid vulcanizing action is achieved with the pressure of the vulcanizing fluid operating through the flexible metal cylinder 70 to hold the belts 92 or other articles to be vulcanized tightly in the molding cavities.

In the embodiment of the invention shown in Fig. 7, the metal cylinder 70 is employed in conjunction with a plain cylindrical mold 90a to vulcanize a substantially cylindrical band 92a of rubber and fabric, often reinforced with helically extending load-bearing cords. In other words, the apparatus of my invention can be employed to vulcanize a rubber sleeve which may thereafter be cut into V-belts having "raw edges," this being a type of belt which has found commercial success.

If it should become advisable to remove the entire cage 54 from inside the heater 10, I provide tapped sockets 150 in the top plate 58 of the cage, these sockets being adapted to have screw eyes fastened therein, whereupon the entire cage can be lifted out of the heater 10 by means of a crane or chain hoist. Thereafter, another cage of a different length or diameter can be positioned in the heater 10 to perform the vulcanizing operation. A filler block can be positioned between the base 48 in the heater 10 and the bottom plate 62 of the cage 54 in vulcanizing operations to be performed with cages of shorter length on molds of shorter length.

From the foregoing it will be recognized that the various objects of my invention have been achieved by the provision of a relatively inexpensive, readily operated, durable and long-lived vulcanizing apparatus particularly adapted to perform vulcanizing operations on V-belts and the like. The apparatus includes a flexible metal cylinder which is readily moved from an expanded to a reduced diameter position, and which during the vulcanizing operation is directly surrounded by the vulcanizing fluid, and with the inner surface of the metal cylinder engaging with molding pressure with the outer surface of the vulcanizing mold. My improved apparatus is quickly adapted to vulcanizing operations upon molds of different diameters and lengths, and the entire apparatus is of the unit type, giving high production efficiencies, and requiring a minimum of floor space.

Although one best-known embodiment of my invention has been illustrated and described in detail, it is to be particularly understood that I am not to be limited thereto or thereby, but that the scope of my invention is defined in the appended claims.

I claim:

1. Vulcanizing apparatus for V-belts and the like comprising a pot heater having an open end, a substantially flat base in the pot heater, a conduit connecting the center portion of the base with the outside of the heater, a cage resting on the base in the heater, said cage including a plurality of plates having round central openings therein, one of the plates being positioned at the top and one at the bottom of the cage, a gasket between the bottom plate of the cage and the base in the heater, a flexible metal cylinder formed from a strip of sheet metal and having overlapped ends carried loosely in the round openings of the cage plates, a ring-shaped gasket secured to the bottom cage plate and having a flexible lip portion engaging with the cylinder, a ring-shaped gasket carried by the top cage plate and having a flexible lip portion engaging with the cylinder, spring means connected between the cage and the overlapped ends of the cylinder and normally holding the cylinder expanded against the round openings in the cage plates, pressure cylinder means mounted between the cage and the overlapped ends of the cylinder to decrease the cylinder diameter, a mold having molding cavities in its outer surface and adapted to be removably received within the cylinder, a closure for the open end of the heater, a closure plate secured with a lost motion connection to the closure, a gasket secured to the top cage plate and adapted to seal with the closure plate, and means for supplying vulcanizing fluid under pressure to the inside of the heater and to the outside of the cylinder.

2. Vulcanizing apparatus for V-belts and the like comprising a pot heater having an open end, a cage in the heater, said cage including a plurality of plates having round central openings therein, one of the plates being positioned at the top and one at the bottom of the cage, sealing means closing the bottom plate of the cage, a flexible metal cylinder formed from a strip of sheet metal and having overlapped ends carried loosely in the round openings of the cage plates, a ring-shaped gasket secured to the bottom cage plate and having a flexible lip portion engaging with the cylinder, a ring-shaped gasket carried by the top cage plate and having a flexible lip portion engaging with the cylinder, spring means connected between the cage and the overlapped ends of the cylinder and normally holding the cylinder expanded against the round openings in the cage plates, pressure cylinder means mounted between the cage and the overlapped ends of the cylinder to decrease the cylinder diameter, a mold having molding cavities in its outer surface and adapted to be removably received within the cylinder, a closure for the open end of the heater, a closure plate secured with a lost motion connection to the closure, a gasket secured to the top cage plate and adapted to seal with the closure plate, and means for supplying vulcanizing fluid under pressure to the inside of the heater and to the outside of the cylinder.

3. Vulcanizing apparatus for V-belts and the like comprising a pot heater having an open end, a cage in the heater, said cage including a plurality of plates having round central openings therein, one of the plates being positioned at the top and one at the bottom of the cage, sealing means closing the bottom plate of the cage, a flexible metal cylinder formed from a strip of sheet metal and having overlapped ends carried loosely in the round openings of the cage plates, a ring-shaped gasket secured to the bottom cage plate and having a flexible lip portion engaging with the cylinder, a ring-shaped gasket carried by the top cage plate and having a flexible lip portion engaging with the cylinder, spring means connected to the overlapped ends of the cylinder and normally holding the cylinder expanded against the round openings in the cage plates, pressure cylinder means to decrease the cylinder diameter, a mold having molding cavities in its outer surface and adapted to be removably received within the cylinder, a closure for the open end of the heater, a closure plate secured with a lost motion connection to the closure, a gasket secured to the top cage plate and adapted to seal with the closure plate, and means for supplying vulcanizing fluid under pressure to the inside of the heater and to the outside of the cylinder.

4. Vulcanizing apparatus for V-belts and the like comprising a pot heater having an open end, a cage in the heater, said cage including a plurality of plates having round central openings therein, one of the plates being positioned at the top and one at the bottom of the cage, sealing means closing the bottom plate of the cage, a flexible metal cylinder formed from a strip of sheet metal and having overlapped ends carried loosely in the round openings of the cage plates, a ring-shaped gasket secured to the bottom cage plate and having a flexible lip portion engaging with the cylinder, a ring-shaped gasket carried by the top cage plate and having a flexible lip portion engaging with the cylinder, spring means connected to the overlapped ends of the cylinder and normally holding the cylinder expanded against the round openings in the cage plates, pressure cylinder means to decrease the cylinder diameter, a mold having molding cavities in its outer surface and adapted to be removably received within the cylinder, a closure for the open end of the heater and adapted to seal with the top cage plate, and means for supplying vulcanizing fluid under pressure to the inside of the heater and to the outside of the cylinder.

5. Vulcanizing apparatus for V-belts and the like comprising a pot heater having an open end, a cage in the heater, said cage including a plurality of plates having round central openings therein, one of the plates being positioned at the top and one at the bottom of the cage, a flexible cylinder formed from a strip of sheet material and having overlapped ends carried loosely in the round openings of the cage plates, a ring-shaped gasket secured to the bottom cage plate and having a flexible lip portion engaging with the cylinder, a ring-shaped gasket carried by the top cage plate and having a flexible lip portion engaging with the cylinder, spring means connected to the overlapped ends of the cylinder and normally holding the cylinder expanded against the round openings in the cage plates, pressure cylinder means to decrease the cylinder diameter, a mold having molding cavities in its outer surface and adapted to be removably received within the cylinder, a closure for the open end of the heater and adapted to seal with the top cage plate, and means for supplying vulcanizing fluid under pressure to the inside of the heater and to the outside of the cylinder.

6. Vulcanizing apparatus for V-belts and the like comprising a pot heater having an open end, a substantially flat base in the pot heater, a conduit connecting the center portion of the base with the outside of the heater, a cage resting on the base in the heater, said cage including a plurality of plates having round central openings therein, one of the plates being positioned at the top and one at the bottom of the cage, a gasket between the bottom plate of the cage and the base in the heater, a flexible metal cylinder formed from a strip of sheet metal and having overlapped ends carried loosely in the round openings of the cage plates, a ring-shaped gasket secured to the bottom cage plate and having a flexible lip portion engaging with the cylinder, a ring-shaped gasket carried by the top cage plate and having a flexible lip portion engaging with the cylinder, a mold having molding cavities in its outer surface and adapted to be removably received within the cylinder, a closure for the open end of the heater, a closure plate secured with a lost motion connection to the closure, a gasket secured to the top cage plate and adapted to seal with the closure plate, and means for supplying vulcanizing fluid under pressure to the inside of the heater and to the outside of the cylinder.

7. Vulcanizing apparatus for V-belts and the like comprising a pot heater, a cage in the heater having an open end, said cage including a plurality of plates having round central openings therein, one of the plates being positioned at the top and one at the bottom of the cage, a flexible metal cylinder formed from a strip of sheet metal and having overlapped ends carried loosely in the round openings of the cage plates, a ring-shaped gasket secured to the bottom cage plate and having a flexible lip portion engaging with the cylinder, a ring-shaped gasket carried by the top cage plate and having a flexible lip portion engaging with the cylinder, a mold having molding cavities in its outer surface and adapted to be removably received within the cylinder, a closure for the open end of the heater and adapted to seal with the top cage plate, and means for supplying vulcanizing fluid under pressure to the inside of the heater and to the outside of the cylinder.

8. A vulcanizer including a chamber, a metal cylinder formed from a strip of flexible sheet metal and having overlapped ends received in the chamber, resilient gasket means sealing with the ends of the cylinder whereby vulcanizing fluid introduced into the chamber will engage with the cylinder only between the gasket means, a removable closure for the chamber, a removable cylindrical mold inside the cylinder having vulcanizing cavities in its periphery, means connected to the overlapped ends of the cylinder for moving the cylinder to an expanded position or to a contracted position around the mold, both of said overlapped ends of the cylinder being formed with feather edges, the outside edge being provided with a radius slightly smaller than the radius of the cylinder and with a longitudinally extending groove to vent off any vulcanizing fluid which works under the overlapped ends, and conduit means connecting the inside of the mold during vulcanization to a source of reduced pressure.

9. A vulcanizer including a chamber, a metal cylinder formed from a strip of flexible sheet metal and having overlapped ends, the cylinder being positionable in the chamber, resilient gasket means sealing with the ends of the cylinder whereby vulcanizing fluid introduced into the chamber will engage with the cylinder only between the gasket means, a removable closure for the chamber, a removable cylindrical mold inside the cylinder having vulcanizing cavities in its periphery, means connected to the overlapped ends of the cylinder for moving the cylinder to an expanded position or to a contracted position around the mold, both of said overlapped ends of the cylinder being formed with feather edges, the outside edge being provided with a longitudinally extending groove to vent off any vulcanizing fluid which works under the overlapped ends, and conduit means connecting the inside of the mold during vulcanization to a source of reduced pressure.

10. A vulcanizer including a chamber, a metal cylinder formed from a strip of flexible sheet metal and having overlapped ends, the cylinder being positionable in the chamber, resilient gasket means sealing with the ends of the cylinder whereby vulcanizing fluid introduced into the chamber will engage with the cylinder only between the gasket means, a removable closure for the chamber, a removable cylindrical mold within the cylinder having vulcanizing cavities in its periphery, and means connected to the overlapped ends of the cylinder for moving the cylinder to an expanded position or to a contracted position around the mold, both of said overlapped ends of the cylinder being formed with feather edges, the outside edge being provided with a longitudinally extending groove to vent off any vulcanizing fluid which works under the overlapped ends.

11. A vulcanizer including a chamber, a cylinder formde from a strip of flexible sheet material and having overlapped ends, the cylinder being positionable in the chamber, resilient gasket means sealing with the ends of the cylinder whereby vulcanizing fluid introduced into the chamber will engage with the cylinder only between the gasket means, a removable closure for the chamber, a removable cylindrical mold inside the cylinder having vulcanizing cavities in its periphery, and means connected to the overlapped ends of the cylinder for moving the cylinder to an expanded position or to a contracted position around the mold.

12. A vulcanizer including a chamber, a metal cylinder formed from a strip of flexible sheet metal and having overlapped ends, the cylinder being positionable in the chamber, resilient gasket means sealing with the ends of the cylinder whereby vulcanizing fluid introduced into the chamber will engage with the cylinder only between the gasket means, a removable closure for the chamber, a removable cylindrical mold inside the cylinder having vulcanizing cavities in its periphery, both of said overlapped ends of the cylinder being formed with feather edges, the outside edge being provided with a radius slightly smaller than the radius of the cylinder and with a longitudinally extending groove to vent off any vulcanizing fluid which works under the overlapped ends, and conduit means connecting the inside of the mold during vulcanization to a source of reduced pressure.

13. A vulcanizer including a chamber, a metal cylinder formed from a strip of flexible sheet metal and having overlapped ends the cylinder being positionable in the chamber, resilient gasket means sealing with the ends of the cylinder whereby vulcanizing fluid introduced into the chamber will engage with the cylinder only between the gasket means, a removable closure for the chamber, a removable cylindrical mold inside the cylinder having vulcanizing cavities in its periphery, both of said overlapped ends of the cylinder being formed with feather edges, and conduit means connecting the inside of the mold during vulcanization to a source of reduced pressure.

14. A vulcanizer including a chamber, a cylinder formed from a strip of flexible sheet material and having overlapped ends, the cylinder being positionable in the chamber, a removable closure for the chamber, a removable cylindrical mold inside the cylinder having vulcanizing cavities in its periphery, and both of said overlapped ends of the cylinder being formed with feather edges, the outside edge being provided with a radius slightly smaller than the radius of the cylinder.

15. A vulcanizer including a chamber, a cylinder formed from a strip of flexible sheet material and having overlapped ends, the cylinder being positionable in the chamber, a removable closure for the chamber, a removable cylindrical mold inside the cylinder having vulcanizing cavities in its periphery, and both of said overlapped ends of the cylinder being formed with feather edges, the outside edge being provided with a longitudinally extending groove to vent off any vulcanizing fluid which works under the overlapped ends.

JOHN F. CAMPBELL.

REFERENCES CITED

The following references are of record in the file of this patent:

UNITED STATES PATENTS

| Number | Name | Date |
| --- | --- | --- |
| 2,172,111 | Schick | Sept. 5, 1939 |
| 2,324,991 | Groncy | July 20, 1943 |